United States Patent [19] [11] Patent Number: 6,113,545
Chiao et al. [45] Date of Patent: *Sep. 5, 2000

[54] ULTRASONIC BEAMFORMING WITH IMPROVED SIGNAL-TO-NOISE RATIO USING ORTHOGONAL COMPLEMENTARY SETS

[75] Inventors: Richard Yung Chiao, Clifton Park, N.Y.; Lewis Jones Thomas, III, Tokoyo, Japan

[73] Assignee: General Electric Company, Schenectady, N.Y.

[ * ] Notice: This patent is subject to a terminal disclaimer.

[21] Appl. No.: 09/228,134

[22] Filed: Jan. 11, 1999

Related U.S. Application Data

[63] Continuation-in-part of application No. 09/063,109, Apr. 20, 1998, Pat. No. 5,984,869.

[51] Int. Cl.[7] ......................................................... A61B 8/00

[52] U.S. Cl. ............................................................. 600/447

[58] Field of Search ..................................... 600/437, 443, 600/447, 455; 73/625–626; 367/7, 11

[56] References Cited

U.S. PATENT DOCUMENTS

| | | | |
|---|---|---|---|
| 4,855,961 | 8/1989 | Jaffe et al. ................................... | 367/7 |
| 5,014,712 | 5/1991 | O'Donnell .............................. | 600/447 |
| 5,984,869 | 11/1999 | Chiao et al. ............................. | 600/437 |

FOREIGN PATENT DOCUMENTS

705564A2  4/1996  European Pat. Off. .

OTHER PUBLICATIONS

Frank, "Polyphase Complementary Codes", IEEE Trans. Inform. Theory, vol. IT–26, No. 6, Nov. 1980, pp. 641–647.
Sivaswamy, "Multiphase Complementary Codes", IEEE Trans. Inform. Theory, vol. IT–24, No. 5, Sep. 1978, pp. 546–552.
Golay, "Complementary Series, "IRE Trans. Inform. Theory, Apr. 1961, pp. 82–87.
Tseng et al., "Complementary Sets of Sequences", IEEE Trans. Inform. Theory, vol. IT–18, No. 5, Sep. 1972, pp.644–651.
Tseng, "Signal Multiplexing in Surface–Wave Delay Lines Using Orthogonal Pairs of Golay's Complementary Sequences", IEEE Trans. Sonics & Ultrasonics, vol. SU–18, No. 2, Apr. 1971, pp. 103–107.
Lee et al., "Golay Codes for Simultaneous Multi–Mode Operation in Phased Arrays", 1982 IEEE Ultrasonics Symposium, pp. 821–825.

*Primary Examiner*—Francis J. Jaworski
*Attorney, Agent, or Firm*—Marvin Snyder; Douglas E. Stoner

[57] ABSTRACT

Signal-to-noise ratio in medical ultrasound imaging is improved by using Golay-encoded excitation of a transducer array. Two orthogonal Golay pairs of sequences are transmitted to respective transmit focal zones. Start of transmission of the Golay pair to the second zone is delayed until shortly after the start of transmission of the Golay pair to the first transmit focal zone such that the two pairs of firings are overlapped in time. The receive filtering follows two parallel paths, one for each focal zone. Each decoding filter (also used for bandpass filtering) supplies its output signal to a vector summer, the output signal of which is multiplexed to conventional B-mode processing (envelope detection, logarithmic compression and edge-enhancement filter), followed by scan conversion for display.

24 Claims, 5 Drawing Sheets

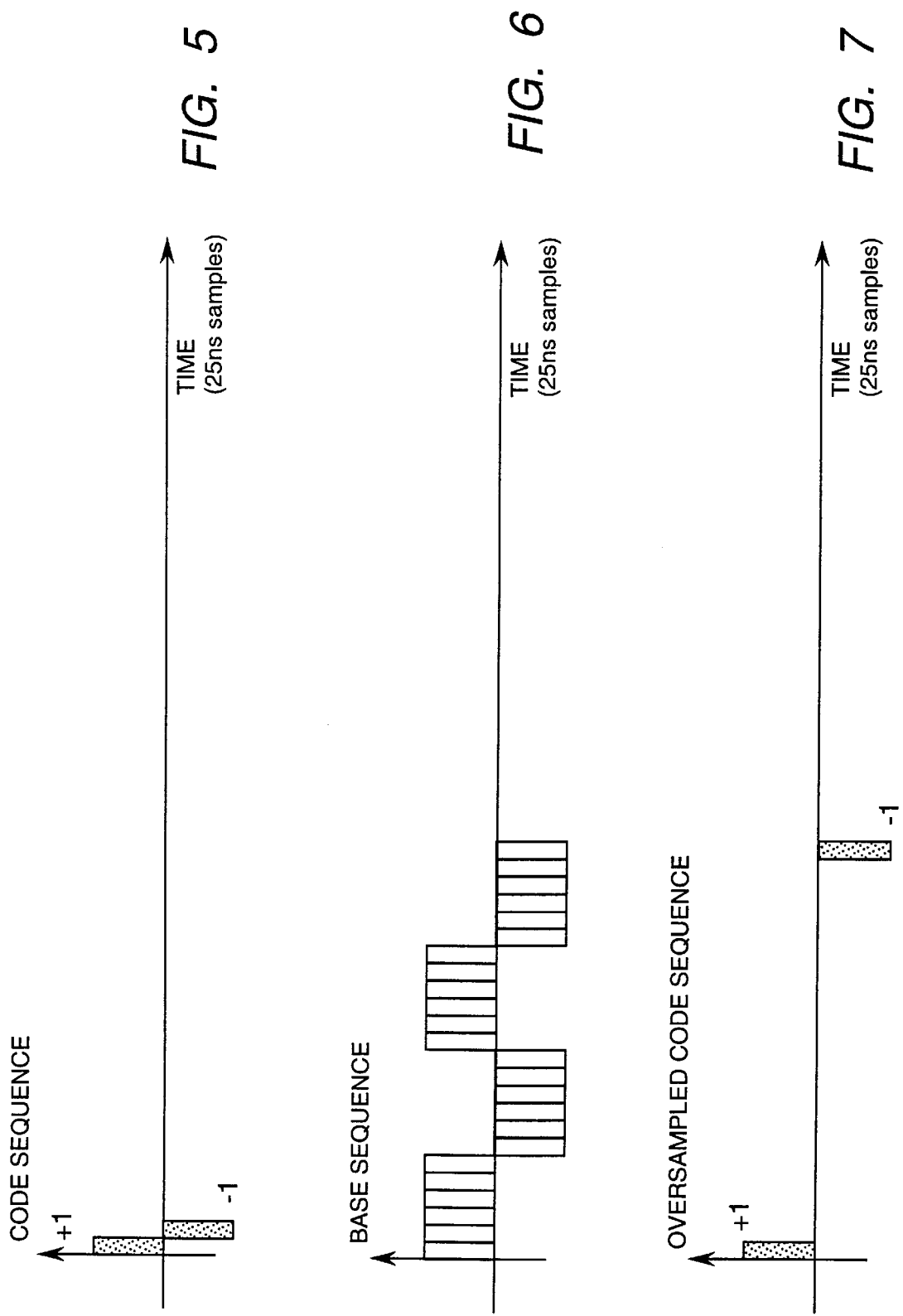

United States Patent

ULTRASONIC BEAMFORMING WITH IMPROVED SIGNAL-TO-NOISE RATIO USING ORTHOGONAL COMPLEMENTARY SETS

RELATED PATENT APPLICATION

This application is a continuation-in-part application of U.S. patent application Ser. No. 09/063,109 filed on Apr. 20, 1998, allowed Nov. 4, 1998 and now U.S. Pat. No. 5,984,869.

FIELD OF THE INVENTION

This invention generally relates to ultrasound imaging systems. In particular, the invention relates to methods and apparatus for increasing the signal-to-noise ratio (SNR) in medical ultrasound imaging.

BACKGROUND OF THE INVENTION

A conventional ultrasound imaging system comprises an array of ultrasonic transducer elements which transmit an ultrasound beam and then receive the reflected beam from the object being studied. Such scanning comprises a series of measurements in which the focused ultrasonic wave is transmitted, the system switches to receive mode after a short time interval, and the reflected ultrasonic wave is received, beamformed and processed for display.

Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. The resolution of a scan line is a result of the directivity of the associated transmit and receive beam pair.

The output signals of the beamformer channels are coherently summed to form a respective pixel intensity value for each sample volume in the object region or volume of interest. These pixel intensity values are log-compressed, scan-converted and then displayed as an image of the anatomy being scanned.

In medical ultrasound imaging systems of the type described hereinabove, it is desirable to optimize the SNR. Additional SNR can be used to obtain increased penetration at a given imaging frequency or to improve resolution by facilitating ultrasonic imaging at a higher frequency.

The use of Golay codes in ultrasound is well known in the area of non-destructive evaluation (NDE) using single-element fixed-focus transducers to inspect inanimate objects. Golay codes are also known in the medical ultrasound imaging community. However, the use of Golay codes in an ultrasound imaging system has been dismissed because dynamic focusing, tissue motion (effects not present in NDE) and nonlinear propagation effects were thought to cause unacceptable code degradation with corresponding range degradation.

U.S. Pat. No. 5,984,869 discloses a method and an apparatus for improving the SNR in medical ultrasound imaging by using Golay-encoded excitation of the transducer array. The SNR is improved by transmitting a pair of Golay-encoded base sequences consecutively on each beam at the same focal position and then decoding the beam-summed data. A pair of Golay-encoded base sequences is formed by convolving a base sequence with a Golay code pair after oversampling. A Golay code pair is a pair of binary (+1, −1) sequences with the property that the sum of the autocorrelations of the two sequences is a Kronecker delta function. An oversampled Golay sequence is the Golay sequence with zeroes between each +1 and −1, the number of zeroes being greater than or equal to one less than the length of the base sequence. The aforementioned property of Golay code pairs translates into two important advantages over codes in general: (1) Golay codes have no range sidelobes, and (2) Golay codes can be transmitted using only a bipolar pulser versus a more expensive digital-to-analog converter.

U.S. Pat. No. 5,984,869 further discloses that tissue motion occurring between the transmission of the two sequences of the Golay pair causes code distortion which increases the range sidelobes. By transmitting the second sequence as soon as the echoes from the first sequence are completely received, the time interval between the two transmits can be minimized. Minimization of the interval between transmits in turn minimizes the motion-induced code distortion.

In the aforementioned medical ultrasound B-mode imaging system using Golay-encoded excitation, the frame rate is reduced by a factor of two compared to conventional imaging because two round-trip delayed firings (i.e., two firings with round-trip propagation delay between them) are necessary for each transmit focal zone compared to only one firing per focal zone in conventional imaging. In other words, two focal zones could be beamformed in conventional imaging in the same amount of time it takes to beamform one focal zone using Golay-encoded excitation. The problem to be solved is how to recover the 2× frame rate reduction in Golay-encoded excitation (or N× reduction in polyphase N-complementary sets in general).

In a paper by B. B. Lee and E. S. Furgason, "Golay Codes for Simultaneous Multi-Mode Operation in Phased Arrays," 1982 IEEE Ultrasonics Symposium, pp. 821–825 (1982), an analog ultrasonic imaging system that transmitted and received two beams simultaneously using orthogonal Golay codes is described. The Lee and Furgason system is a rudimentary analog phased array system capable only of sector scans and incapable of multiple transmit focal zones along a beam direction. Thus there is need for an ultrasonic imaging system using Golay-encoded excitation which improves upon the prior art.

SUMMARY OF THE INVENTION

The method and apparatus of the invention for improving SNR in medical ultrasound imaging by using Golay-encoded excitation of the transducer array improves upon the prior art of Lee and Furgason in several respects. First, a preferred embodiment of the invention is a digital system capable of multiple transmit focal zones in sector (phased array) as well as non-sector (linear and curvilinear) scans. Two transmit focal zones are beamformed using orthogonal Golay codes in slightly more time than the time needed for two round-trip delayed firings, thereby recovering almost all of the 2× frame rate reduction suffered by Golay-coded excitation. Next, the simultaneous transmission of multiple beams in the prior art requires parallel transmit beamforming hardware which is inefficient and expensive, while the invention utilizes sequential transmission of the beams, which requires only one set of transmit hardware when bipolar pulsers are used. Finally, the invention can be extended to polyphase codes and to more than two focal zones.

Orthogonal Golay pairs $[A_1, A_2]$ and $[B_1, B_2]$, exist where $A_1, A_2, B_1$ and $B_2$ are each length N (power of two) bipolar sequences, e.g., $A_1 = [a_1(1), a_1(2), \ldots, a_1(N)]$, such that the Golay complementary condition holds for each pair (i.e., each pair is a Golay pair):

$$a_1(n) \otimes a_1(n) + a_2(n) \otimes a_2(n) = 2N\delta(n) \quad (1)$$

$$b_1(n) \otimes b_1(n) + b_2(n) \otimes b_2(n) = 2N\delta(n) \quad (2)$$

where $\otimes$ denotes correlation and $\delta(n)$ is the Kronecker delta function; and the orthogonality condition holds between the two Golay pairs:

$$a_1(n) \otimes b_1(n) + a_2(n) \otimes b_2(n) = 0 \quad (3)$$

In conventional Golay-coded excitation involving two focal zones A and B, a pair of Golay codes is first transmitted to A followed by another pair of Golay codes to B with the round-trip propagation delay T between each transmit. The sequence of transmits may be expressed as $$A_1\text{-}(T)\text{-}A_2\text{-}(T)\text{-}B_1\text{-}(T)\text{-}B_2\text{-}(T)\text{-} \ldots \quad (4)$$

where (T) denotes the round-trip propagation delay. Thus the above sequence of transmits has a total transmit duration of about 4T. In the preferred embodiment of the invention, two orthogonal Golay pairs of sequences are transmitted to the respective zones as above; however, the Golay pair to the second zone starts shortly after the start of the Golay pair to the first transmit focal zone such that the two pairs of firings are interleaved:

$$A_1\text{-}B_1\text{-}(T)\text{-}A_2\text{-}B_2\text{-}(T)\text{-} \ldots \quad (5)$$

The interval between the two firings in a Golay pair ($[A_1, A_2]$ or $[B_1, B_2]$) is thus slightly greater than T (typically about 1–2%) in order to accommodate the extra firing in between the Golay pair. The total duration of the four transmits is now slightly over 2T, which recovers almost all of the 2× frame rate loss, given that the two pairs of firings can be sorted out to beamform focal zones A and B respectively.

Transmitting $A_1$ and $B_1$ without the round-trip propagation delay results in overlap between the echoes from the two transmits, and similarly for $A_2$ and $B_2$, which must be separated in the receive filtering in order to properly beamform the two transmit focal positions. The receive filtering follows two parallel paths, one for each focal zone. Each decoding filter (also used for bandpass filtering (BPF)) supplies an output signal to a vector summer, the output signal of which multiplexes to conventional B-mode processing (envelope detection, logarithmic compression and edge-enhancement filter), followed by scan conversion for display.

BRIEF DESCRIPTION OF THE DRAWINGS

FIGS. 5, 6, 7, 8 and 9 are pulse diagrams showing a Golay code sequence (FIG. 5), a base sequence (FIG. 6), an oversampled Golay code sequence (FIG. 7), and a pair of Golay-encoded base sequences (FIGS. 8 and 9) in accordance with a preferred embodiment of the invention.

DETAILED DESCRIPTION OF THE PREFERRED EMBODIMENTS

Figure 1:
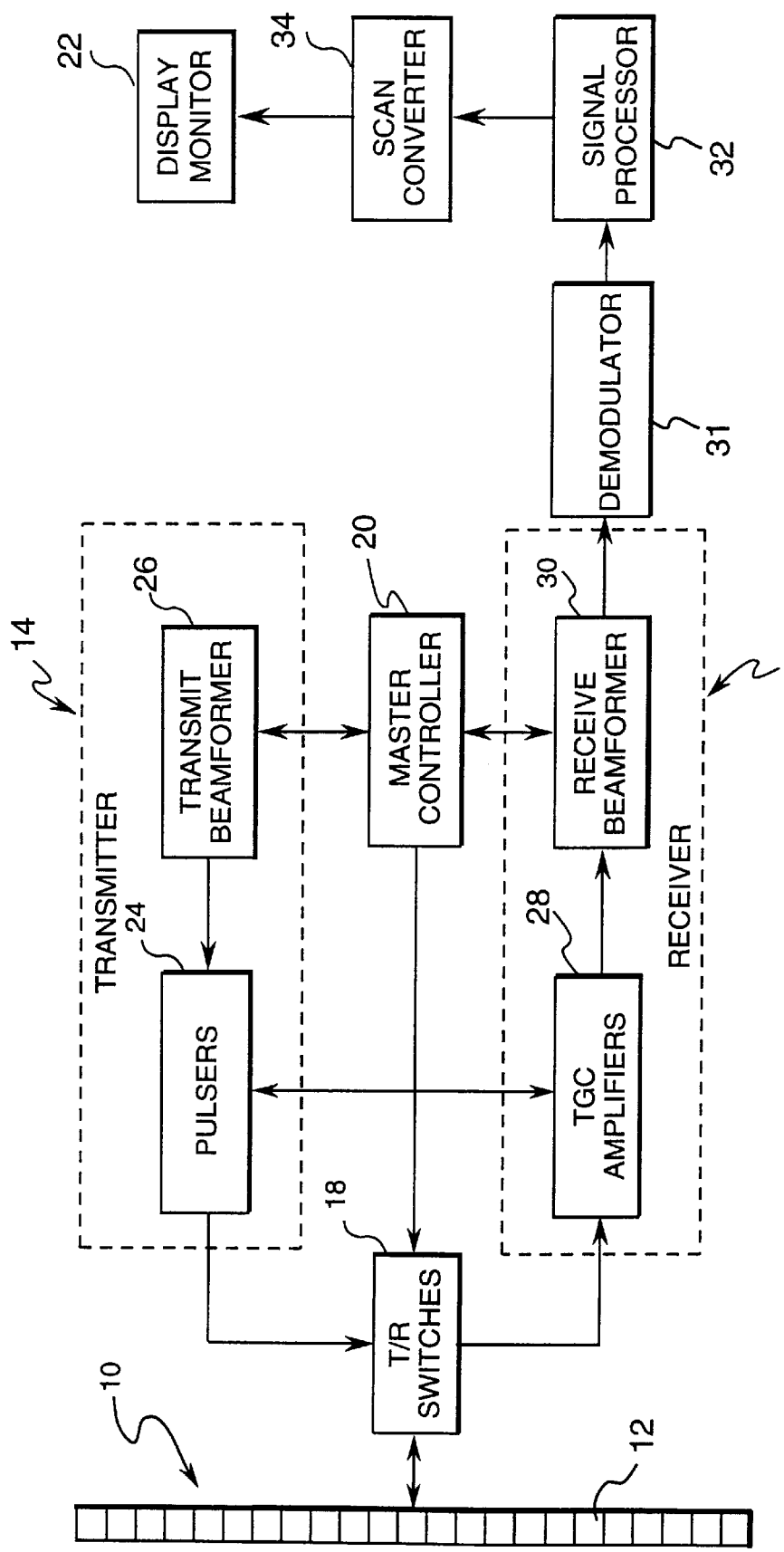
FIG. 1 is a block diagram of an ultrasound imaging system which can be programmed to incorporate the present invention.

An ultrasonic imaging system which incorporates the invention is depicted in FIG. 1 and comprises a transducer array 10 having a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. The T/R switches are typically diodes which protect the receive electronics from the high voltages generated by the transmit electronics. The transmit signal causes the diodes to shut off or limit the signal to the receiver. Transmitter 14 and receiver 16 are operated under control of a master controller 20 responsive to commands by a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a display monitor 22.

Under the direction of master controller 20, transmitter 14 drives transducer array 10 such that the ultrasonic energy is transmitted as a directed focused beam. To accomplish this, respective time delays are imparted to a multiplicity of pulsers 24 by a transmit beamformer 26. Master controller 20 determines the conditions under which the acoustic pulses will be transmitted. With this information, transmit beamformer 26 determines the timing and amplitudes of each of the transmit pulses to be generated by pulsers 24. The amplitudes of each transmit pulse are generated by an apodization generation circuit (not shown). Pulsers 24 in turn send the transmit pulses to each of the elements 12 of the transducer array 10 via T/R switches 18, which protect time-gain control (TGC) amplifiers 28 from the high voltages which may exist at the transducer array. By appropriately adjusting the transmit focus time delays and the apodization weightings in a conventional manner, an ultrasonic beam can be directed and focused to form a transmit beam.

The echo signals produced by each burst of ultrasonic energy reflect from objects located at successive ranges along each transmit beam. The echo signals are sensed separately by each transducer element 12 and a sample of the magnitude of the echo signal at a particular point in time represents the amount of reflection occurring at a specific range. Due to differences in the propagation paths between a reflecting point and each transducer element 12, the echo signals will not be detected simultaneously and their amplitudes will not be equal. Receiver 16 amplifies the separate echo signals via a respective TGC amplifier 28 in each receive channel. The amount of amplification provided by TGC amplifiers 28 is controlled through a control line (not shown). The amplified echo signals are then fed to a receive beamformer 30. Each receiver channel of the receive beamformer is coupled to a respective one of transducer elements 12 by a respective TGC amplifier 28.

Under the direction of master controller 20, receive beamformer 30 tracks the direction of the transmitted beam, sampling the echo signals at a succession of ranges along each beam. Receive beamformer 30 imparts the proper time delays and receive apodization weightings to each amplified echo signal and sums them to provide an echo signal which accurately indicates the total ultrasonic energy reflected from a point located at a particular range along one ultrasonic beam. The receive focus time delays are computed in real-time using specialized hardware or are read from a lookup table. The receive channels also have circuitry for filtering the received pulses. The time-delayed receive signals are then summed.

In the system shown in FIG. 1, the frequency of the receive beamformer output signal is shifted to baseband by a demodulator 31. One way of achieving this is to multiply the input signal by a complex sinusoidal $e^{i2\pi f_d t}$, where $f_d$ is the frequency shift required to bring the signal spectrum to baseband. The beamsummed and demodulated signal is then supplied to a signal processor 32 which converts the summed receive signals to display data. In the B-mode (gray-scale), this is the envelope of the signal with some additional processing, such as edge enhancement and logarithmic compression. A scan converter 34 receives the display data from signal processor 32 and converts the data into the desired image for display. In particular, scan converter 34 converts the acoustic image data from polar coordinate (R-θ) sector format or Cartesian coordinate linear array to appropriately scaled Cartesian coordinate display pixel data at the video rate. These scan-converted acoustic data are then supplied for display to display monitor 22, which images the time-varying amplitude of the envelope of the B-mode signal as a gray scale. A respective scan line is displayed for each transmit beam.

Figure 2:
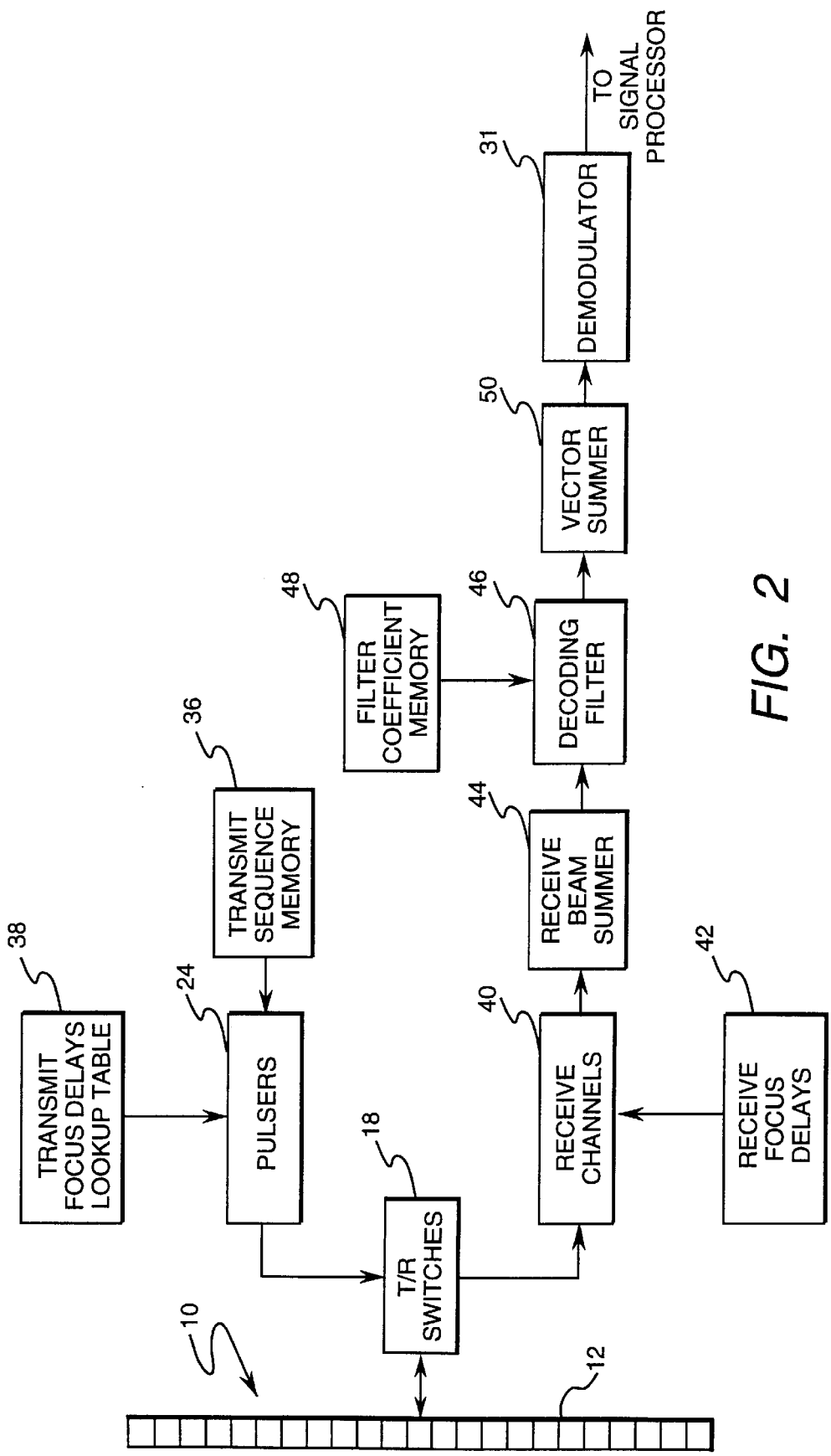
FIG. 2 is a block diagram of an ultrasound imaging system in accordance with the invention disclosed in U.S. Pat. No. 5,984,869.

FIG. 2 shows an ultrasound imaging system of the type disclosed in U.S. patent application Ser. No. 09/063,109. In this system each transducer element in the transmit aperture is pulsed using a coded sequence of a base sequence, each pulse in the coded sequence being commonly referred to as a chip. The base sequence is phase encoded, using N-digit transmit codes, to create N-chip coded sequences which are stored in a transmit sequence memory 36. Each coded sequence read out of transmit sequence memory 36 controls activation of a multiplicity of pulsers 24 during a respective transmit firing. For example, the transducer elements are pulsed in accordance with a first coded sequence during a first transmit firing focused at a desired transmit focal position and in accordance with a second coded sequence during a second transmit firing focused at the same transmit focal position. The first and second coded sequences are generated by respectively convolving first and second transmit codes with the base sequence, i.e., by phase encoding the base sequence using the transmit codes. In accordance with a preferred embodiment, the first and second transmit codes are complementary Golay codes, i.e., the Golay code pair [1,1] and [1,−1], and the pulsers 24 are bipolar.

Pulsers 24 drive elements 12 of transducer array 10 such that the ultrasonic energy produced is focused in a beam for each transmit firing. To accomplish this, transmit focus time delays from a lookup table 38 are imparted to the respective pulsed waveforms produced by the pulsers. By appropriately adjusting the transmit focus time delays in a conventional manner, the ultrasonic beams can be focused at a multiplicity of transmit focal positions to effect a scan in an image plane.

For each transmit, the echo signals from transducer elements 12 are fed to respective receive channels 40 of the receive beamformer. Each receive channel includes an analog-to-digital converter (not shown). Under the direction of master controller 20 (FIG. 1), receive beamformer 30 (FIG. 1) tracks the direction of the transmitted beam. A receive beamformer memory 42 imparts the proper receive focus time delays to the received echo signals which are summed to provide a composite echo signal that accurately represents the total ultrasonic energy reflected from a particular transmit focal position. The time-delayed receive signals are summed in a receive summer 44 for each transmit firing.

The summed receive signals from successive firings are supplied to a decoding filter 46 which correlates the first summed receive signal with the first receive code for the first transmit firing and correlates the second summed receive signal with the second receive code for the second transmit firing. The filtered signals derived from the first and second transmit firings focused at the same transmit focal position are summed in a vector summer 50 and the summed filtered signals are then demodulated and supplied to signal processor 32 (FIG. 1). In the B mode, signal processing includes envelope detection, edge enhancement and logarithmic compression. Following signal processing and scan conversion, a scan line is displayed on display monitor 22 (FIG. 1). This procedure is repeated so that a respective scan line is displayed for each transmit focal position (in the case of one transmit focal position for each beam angle) or for each vector (in the case of multiple transmit focal positions for each beam angle).

In the system shown in FIG. 2, the second Golay-encoded sequence is transmitted as soon as the echoes from the first Golay-encoded sequence have been completely received. As a result, the frame rate is reduced by a factor of two compared to conventional imaging because two round-trip delayed firings (i.e., two firings with round-trip propagation delay between them) are necessary for each transmit focal zone compared to only one firing per focal zone in conventional imaging.

Figure 3:
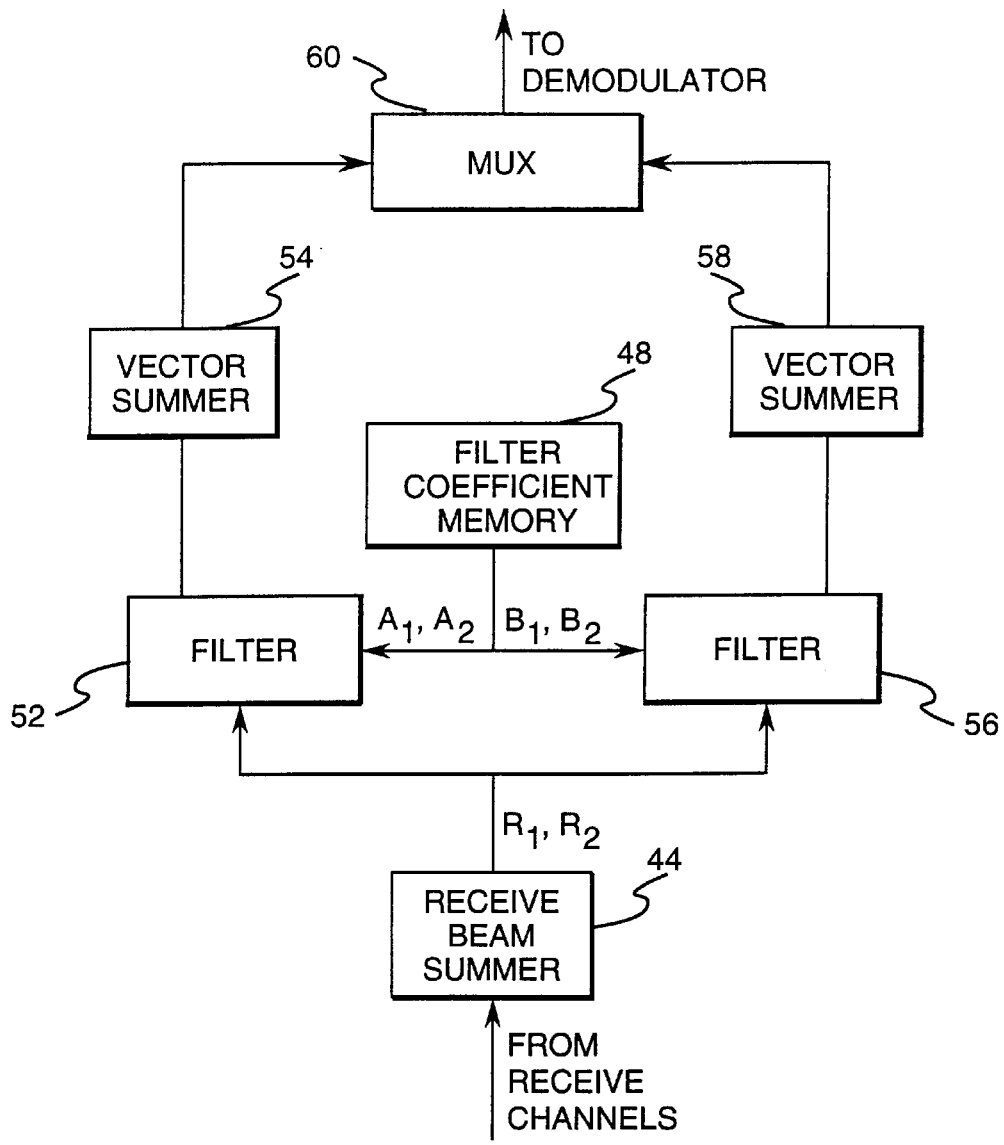
FIG. 3 is block diagram of a portion of an ultrasonic imaging system using overlapping Golay-encoded excitation of transducer elements and parallel decoding of the corresponding receive waveforms in accordance with a preferred embodiment of the invention.

FIG. 3 is a block diagram of a medical ultrasound imaging system in accordance with a preferred embodiment of the invention. This imaging system operates in a conventional manner when imaging shallow transmit focal zones (which generally have adequate SNR). However, for deep transmit focal zones (which generally have inadequate SNR) the system uses Golay-encoded excitation.

For the sake of brevity, FIG. 3 does not repeat elements 10, 18, 24, 36, 38, 40 and 42 of FIG. 2; however, to understand the invention, it should be appreciated that the components depicted in FIG. 3 are combined with the aforementioned elements from FIG. 2. Therefore the following discussion makes reference to both FIGS. 2 and 3.

In a preferred embodiment of the invention, the 2× frame rate reduction in Golay-encoded excitation is recovered by transmitting the first and second orthogonal Golay pairs without the round-trip propagation delay between the respective starts of those transmissions. In particular, in accordance with a preferred embodiment of the invention, two orthogonal Golay pairs of sequences $[A_1, A_2]$ and $[B_1, B_2]$ are transmitted to respective transmit focal zones, with the Golay pair $[B_1, B_2]$ that is transmitted to the second zone being started shortly after the start of trannsmission of the Golay pair $[A_1, A_2]$ to the first transmit focal zone. Transmitting $A_1$ and $B_1$ without the round-trip propagation delay results in overlap between the echoes from the two transmits, and similarly for $A_2$ and $B_2$,. These overlaps must be removed in the receive filtering in order to restore the separations and properly beamform the two transmit focal positions. The receive filtering follows two parallel paths, one for each focal zone.

Figure 4:
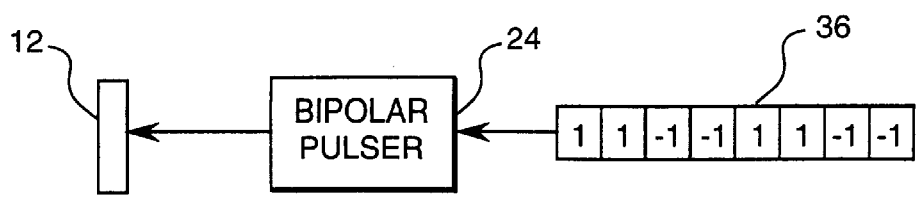
FIG. 4 is a block diagram showing the arrangement for Golay-encoded excitation of a single transducer element in accordance with the invention.

During each firing, (and with reference to FIG. 2), bipolar pulsers 24 are excited by a Golay-encoded base sequence supplied by transmit sequence memory 36 or by specialized hardware. In response to the Golay-encoded base sequence from transmit sequence memory 36 and the transmit focus delays provided by lookup table 38, pulsers 24 provide Golay-encoded pulse sequences to the respective transducer elements 12 making up the transmit aperture. FIG. 4 shows one such base sequence stored in transmit memory 36 for driving a transducer element 12. The +1 and −1 elements of each Golay-encoded base sequence are transformed into pulses of opposite phase by the bipolar pursers.

The orthogonal Golay code pair is transmitted not directly but by first oversampling (typically at 40 MHz or dt=0.025 microsecond time samples) the sequences and then convolving the oversampling sequences with a base sequence to form the orthogonal Golay encoded base sequences. Each orthogonal Golay encoded base sequence can be transmitted much more efficiently since its spectrum is better matched to the transducer passband with proper selection of the base sequence.

FIG. 4 illustrates generation of the transmitted waveform by exciting each transducer element 12 with a sequence of regularly spaced bipolar pulses. This pulse sequence is specified by a sequence of +1's and −1's stored in transmit memory 36 and provided to bipolar pulser 24. Although FIG. 4 depicts only eight samples stored in transmit memory 36, in practice the transmit memory will store 64, 128 or more samples read out at a sampling rate of, e.g., 40 MHz. For two Golay code pairs [+1,+1] and [+1,−1] and a base sequence of [−1,+1,+1,−1], the following Golay-encoded base sequence would be stored in transmit memory 36 for the first firing: [−1,+1,+1,−1,−1,+1,+1,−1]. For the second firing, the following Golay-encoded base sequence would be stored in the transmit memory: [−1,+1,+1,−1,+1,−1,+1].

Figure 8:
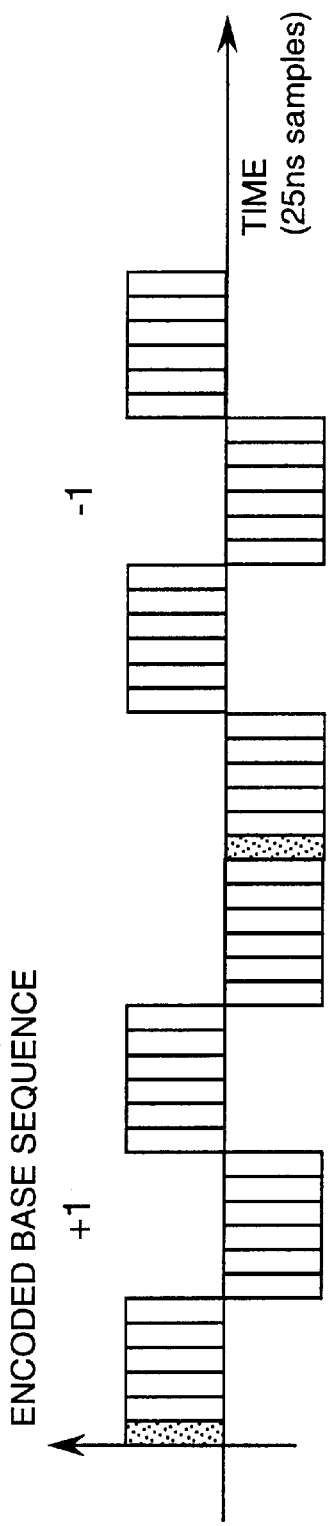
Figure 9:
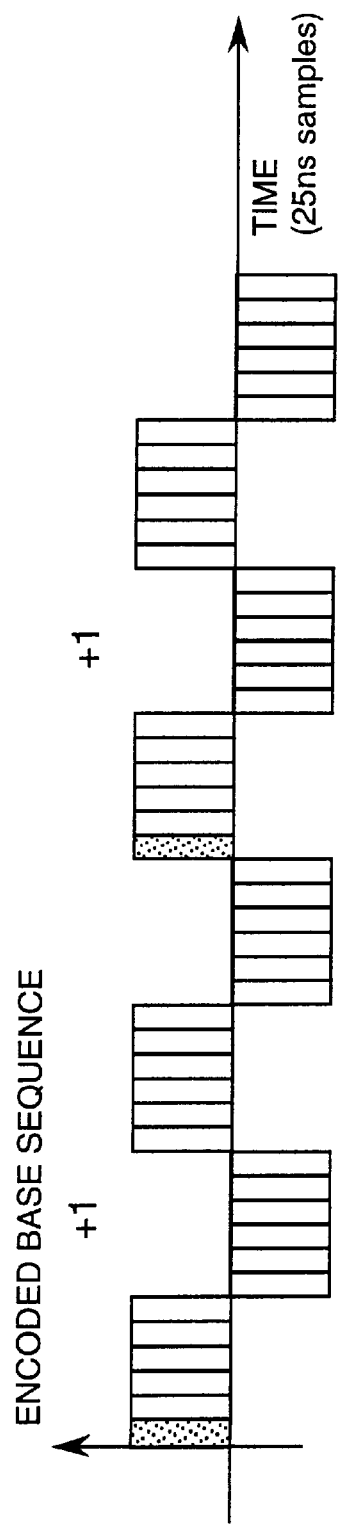

FIGS. 5–8 illustrate formation of a transmit (Golay-encoded) base sequence from the convolution of a base sequence with one of a pair of oversampled Golay sequences. The Golay sequence [+1,−1] is shown in FIG. 5. The base sequence is designed to optimize the resulting ultrasonic pulse shape and spectral energy. In the example depicted in FIG. 6, the base sequence is a sequence of pulses having the following polarities: [+1,+1,+1,+1,+1,+1,−1,−1,−1,−1,−1,−1]. For a first firing, the base sequence is convolved with an oversampled Golay sequence (see FIG. 7) corresponding to Golay code [+1,−1]. The resulting Golay-encoded base sequence is shown in FIG. 8. For a second firing, the base sequence is convolved with an oversampled Golay sequence (not shown) corresponding to Golay code [+1,+1]. The resulting Golay-encoded base sequence is shown in FIG. 9. The Golay-encoded base sequences are precomputed and stored in the transmit sequence memory 36 (FIG. 2). The transmit sequence, after exciting the transducer element, results in a sequence of ultrasonic pulses with polarity determined by a Golay sequence for each firing.

For each firing, the echo signals from the resulting focused beam are transduced into electrical signals by the transducer elements making up the receive aperture. These receive signals are amplified and time-delayed in receive channels 40 (FIG. 2) in accordance with the receive focus time delays 42 (FIG. 2) computed in real-time by specialized hardware or supplied from a lookup table. The amplified and delayed signals are then summed by receive beam summer 44 (FIG. 2).

When two orthogonal Golay pairs of sequences $[A_1, A_2]$ and $[B_1, B_2]$ are transmitted to respective transmit focal zones, the summed receive signals $R_1$ and $R_2$ are decoded by a pair of Golay decoders, where $R_1=A_1+B_1$ denotes the superposition of echoes from the $A_1$ transmit and from the $B_1$ transmit, and $R_2=A_2+B_2$ denotes the superposition of echoes from the $A_2$ transmit and from the $B_2$ transmit. As shown in FIG. 3, the first Golay decoder comprises a decoding filter 52 and a vector summer 54, while the second Golay decoder comprises a decoding filter 56 and a vector summer 58. The summed receive signal $R_1$ is supplied both to decoding filter 52, which correlates the summed receive signal $R_1$ with the receive code $A_1$, and to decoding filter 56, which correlates the summed receive signal $R_1$ with the receive code $B_1$. The receive codes are supplied by a filter coefficient memory 48 in the form of filter coefficients. On receive, the time-reversed oversampled sequences are used as the filter coefficients (time reversed in order to implement correlation in a FIR filter). Filtering with $A_1$ yields $$R_1 \otimes A_1 = A_1 \otimes A_1 + B_1 \otimes A_1 \qquad (6)$$

which is stored in vector summer 54. Similarly, filtering with $B_1$ yields $$R_1 \otimes B_1 = A_1 \otimes B_1 + B_1 \otimes B_1 \quad (7)$$

which is stored in vector summer 58. Subsequently, the summed receive signal $R_2$ is supplied to decoding filter 52, which correlates the summed receive signal $R_2$ with the receive code $A_2$, and to decoding filter 56, which correlates the summed receive signal $R_2$ with the receive code $B_2$. Filtering with $A_2$ yields $$R_2 \otimes A_2 = A_2 \otimes A_2 + B_2 \otimes A_2 \quad (8)$$

which is summed in vector summer 54 to yield $$A_1 \otimes A_1 + B_1 \otimes A_1 + A_2 \otimes A_2 + B_2 \otimes A_2 = A_1 \otimes A_1 + A_2 \otimes A_2 = N\delta \quad (9)$$

with signals for focal zone A isolated and Golay decoded. Similarly, filtering with $B_2$ yields $$R_2 \otimes B_2 = A_2 \otimes B_2 + B_2 \otimes B_2 \quad (10)$$

which is summed in vector summer 58 to yield $$A_1 \otimes B_1 + B_1 \otimes B_1 + A_2 \otimes B_2 + B_2 \otimes B_2 = B_1 \otimes B_1 + B_2 \otimes B_2 \\ B_2 = N\delta \quad (11)$$

with signals for focal zone B isolated and Golay decoded.

In a preferred embodiment of the invention, each decoding filter comprises a respective FIR (finite impulse response) filter which also performs bandpass filtering and each vector summer comprises a respective buffer memory having an input coupled to the output of the respective FIR filter. For each pair of overlapping echo signals, a respective set of filter taps are read out of filter coefficient memory 48 and into the respective FIR filters.

For each firing, filtering is performed using the oversampled Golay sequences corresponding to the Golay-encoded base sequence employed during transmission. The time-reversed oversampled Golay sequences are stored in memory 48 and are supplied to decoding filters 52 and 56 at the appropriate times. The decoding filters are FIR filters which perform the correlation:

$$x(n) * \overline{y(n)} = \sum_m x(m+n)\overline{y(m)}$$

where * denotes convolution and the overbar denotes conjugation (if x and y are complex). The results of the correlations are summed in vector summers 54 and 58 respectively to form the decoded signals, which are supplied in sequence via a multiplexer 60 to the B-mode processor 32 (FIG. 1) for further processing. Except for improved SNR, the decoded Golay pulse is virtually the same as that obtained by transmitting the base sequence instead of the Golay-encoded base sequence.

A major advantage of the Golay code lies in its use of a bipolar pulser for code transmission versus the more expensive digital-to-analog converter that is required to transmit other codes such as the apodized chirp. In addition, the Golay code theoretically has no range lobes, which is not true of any other code.

The imaging system can also operate by demodulating the RF echo signals to baseband and downsampling before or after the beamsum. In this event, the oversampled Golay sequences that are stored for correlation would also be demodulated to baseband and downsampled.

The two transmit focal zones used for orthogonal Golay coded excitation may be along the same beam vector or along different beam vectors. In the former instance, a scan controller (not shown) would indicate the summer output signal for the deeper zone to be truncated and appended to the summer output signal for the shallower zone at the appropriate range position to form one scan line before being displayed. In the latter instance, each of the two focal zones corresponds to a respective scan line. As (orthogonal) Golay coded excitation is used only in the deeper zones, there also may be conventional zones in the shallower regions.

While only certain preferred features of the invention have been illustrated and described herein, many modifications and changes will occur to those skilled in the art. For instance, the invention is not limited to using biphase codes; polyphase codes can alternatively be used. Additionally, the method described herein can be extended to more than two focal zones using orthogonal complementary sets. Further, it will be apparent that Golay coding can be used on separate receive subapertures to reduce the effects of dynamic focusing; for example, a receive aperture can be divided into two or more subapertures for a single transmit event, and the subapertures can be different for paired transmit events provided that the overall receive aperture is the same. For each transmit event the receive signals are beamformed for each subaperture, the beamformed signals for the respective subapertures are filtered and then the filtered signals of the respective subapertures are summed. It is, therefore, to be understood that the appended claims are intended to cover all such modifications and changes as fall within the true spirit of the invention.

What is claimed is:

1. A system for imaging ultrasound scatterers, comprising:
   an ultrasound transducer array comprising a multiplicity of transducer elements;
   a transmit beamformer programmed to cause said transducer array to transmit first through fourth beams of encoded pulse sequences derived from first through fourth code sequences respectively, said first and second code sequences being a first complementary pair, said third and fourth code sequences being a second complementary pair, said first and second complementary pairs being orthogonal, said first and second beams having a first transmit focal zone, and said third and fourth beams having a second transmit focal zone different than said first transmit focal zone;
   a receive beamformer programmed to form a first beamsummed receive signal from a first set of signals received and transduced by said transducer array following transmission of said first and third beams and to form a second beamsummed receive signal from a second set of signals received and transduced by said transducer array following transmission of said second and fourth beams;
   a first filter for passing a first signal component from said first beamsummed receive signal and a second signal component from said second beamsummed receive signal;
   a second filter for passing a third signal component from said first beamsummed receive signal and a fourth signal component from said second beamsummed receive signal;
   a vector summer for summing said first and second signal components to form a first decoded signal which corresponds to said first transmit focal zone and for summing said third and fourth signal components to form a second decoded signal which corresponds to said second transmit focal zone;
   a processor programmed to form first and second image signals derived from said first and second decoded signals respectively; and a display monitor for displaying an image having a first image portion which is a function of said first image signal and a second image portion which is a function of said second image signal.

2. The system as defined in claim 1, wherein the transmissions of said second and third beams are separated by a first time interval, the transmissions of said first and third beams are separated by a second time interval and the transmissions of said second and fourth beams are separated by a third time interval, said first time interval being of greater duration than each of said second and third time intervals.

3. The system as defined in claim 2, wherein duration of said second time interval equals duration of said third time interval.

4. The system as defined in claim 1, further comprising a filter coefficient memory for providing first and second sets of filter coefficients to said first filter for use in filtering said first and second beamsummed receive signals respectively, and for providing third and fourth sets of filter coefficients to said second filter for use in filtering said first and second beamsummed receive signals respectively.

5. The system as defined in claim 4, wherein said first and second sets of filter coefficients are adapted to cause said first filter to correlate said first and second beamsummed receive signal with said first and second code sequences respectively to produce said first and second signal components respectively, and are further adapted to cause said third and fourth sets of filter coefficients to correlate said first and second beamsummed receive signal with said third and fourth code sequences respectively to produce said third and fourth signal components respectively.

6. The system as defined in claim 1, wherein said first complementary pair of code sequences is a first Golay code pair and said second complementary pair of code sequences is a second Golay code pair.

7. The system as defined in claim 6 wherein said first and second Golay decoders comprise:

decoding filters for passing first and second signal components from said first beamsummed receive signal and third and fourth signal components from said second beamsummed receive signal; and vector summers for vector summing said first and third signal components to form a first decoded signal which corresponds to said first transmit focal zone and for vector summing said second and fourth signal components to form a second decoded signal which corresponds to said second transmit focal zone.

8. The system as defined in claim 7 wherein said decoding filters comprise finite impulse response filters.

9. The system as defined in claim 7, wherein said decoding filters comprise first and second filters arranged in parallel to receive said first and second beamsummed receive signals, and a filter coefficient memory for providing first and second sets of filter coefficients to said first filter for use in filtering said first and second beamsummed receive signals respectively, and for providing third and fourth sets of filter coefficients to said second filter for use in filtering said first and second beamsummed receive signals respectively.

10. The system as defined in claim 9, wherein said first and second sets of filter coefficients provided by said filter coefficient memory are selected to cause said first filter to correlate said first and second beamsummed receive signal with said first and second oversampled code sequences respectively to produce said first and second signal components respectively, and said third and fourth sets of filter coefficients provided by said filter coefficient memory are selected to cause said second filter to correlate said first and second beamsummed receive signal with said third and fourth oversampled code sequences respectively to produce said third and fourth signal components respectively.

11. A system for imaging ultrasound scatterers, comprising:

an ultrasound transducer array comprising a multiplicity of transducer elements;

a code sequence source for providing first and second encoded base sequences respectively derived from convolution of a base sequence with first and second oversampled code sequences of a first pair of code sequences and third and fourth encoded base sequences respectively derived from convolution of said base sequence with third and fourth oversampled code sequences of a second pair of code sequences, said first pair of code sequences being complementary, said second pair of code sequences being complementary and said first and second pairs of code sequences being orthogonal;

a look-up table programmed to cause said transducer array to transmit first through fourth beams of encoded pulse sequences produced using said first through fourth encoded base sequences respectively, said first and second beams having a first transmit focal zone, and said third and fourth beams having a second transmit focal zone different than said first transmit focal zone;

a multiplicity of receive channels coupled to said transducer array for receiving a first set of signals from selected transducer elements following transmission of said first and third beams and prior to transmission of said second and fourth beams, and for receiving a second set of signals from selected transducer elements following transmission of said second and fourth beams;

a receive beamformer programmed to form a first beamsummed receive signal from said first set of signals and a second beamsummed receive signal from said second set of signals;

first and second Golay decoders for converting said first and second signal components from said first beamsummed receive signal and said third and fourth signal components from said second beamsummed receive signal into a first decoded signal which corresponds to said first transmit focal zone and a second decoded signal which corresponds to said second transmit focal zone;

a processor programmed to form first and second image signals derived from said first and second decoded signals respectively; and a display monitor for displaying an image having a first image portion which is a function of said first image signal and a second image portion which is a function of said second image signal.

12. The system as defined in claim 11, wherein said look-up table is programmed such that the transmissions of said second and third beams are separated by a first time interval, the transmissions of said first and third beams are separated by a second time interval and the transmissions of said second and fourth beams are separated by a third time interval, said first time interval being greater than each of said second and third time intervals.

13. The system as defined in claim 12, wherein said look-up table is programmed such that said second time interval equals said third time interval.

14. The system as defined in claim 7, wherein said first pair of code sequences produced by said code sequence source is a first Golay code pair and said second pair of code sequences produced by said code sequence source is a second Golay code pair.

15. The system as defined in claim 11, including a multiplicity of bipolar pulsers respectively coupled to said transducer elements and to said code sequence source.

16. The method as defined in claim 15, wherein said first complementary pair of code sequences is a first Golay code pair and said second complementary pair of code sequences is a second Golay code pair.

17. A method for transmitting ultrasound beams using an ultrasound transducer array including a multiplicity of transducer elements, comprising the steps of:

deriving first through fourth encoded base sequences from convolution of a base sequence with first through fourth code sequences, said first and second code sequences being a first complementary pair, said third and fourth code sequences being a second complementary pair, and said first and second complementary pairs being orthogonal;

driving each of a first set of said transducer elements with a first encoded pulse sequence corresponding to said first encoded base sequence and with a first set of time delays to form a first beam focused in a first transmit focal zone;

driving each of a second set of said transducer elements with a third encoded pulse sequence corresponding to said third encoded base sequence and with a second set of time delays to form a second beam focused in a second transmit focal zone different than said first transmit focal zone;

driving each of said first set of said transducer elements with a second encoded pulse sequence corresponding to said second encoded base sequence and with said first set of time delays to form a third beam focused in said first transmit focal zone; and driving each of said second set of said transducer elements with a fourth encoded pulse sequence corresponding to said fourth encoded base sequence and with said second set of time delays to form a fourth beam focused in said second transmit focal zone.

18. A method for imaging ultrasound scatterers, comprising the steps of:

transmitting first and second beams of encoded pulse sequences, said first beam having a first transmit focal zone and said second beam having a second transmit focal zone different than said first transmit focal zone, the start of transmission of said first beam and the start of transmission of said second beam being separated by a time interval less than a round-trip propagation delay;

forming a first beamsummed receive signal from a first set of signals received and transduced by said transducer array following transmission of said first and second beams;

filtering said first beamsummed receive signal to form first and second signal components;

after said ultrasonic echoes of said first and second beams have been received by said transducer array, transmitting third and fourth beams of encoded pulse sequences, said third beam having said first transmit focal zone and said fourth beam having said second transmit focal zone, the start of transmission of said third beam and the start of transmission of said fourth beam being separated by a time interval less than said round-trip propagation delay;

forming a second beamsummed receive signal from a second set of signals received and transduced by said transducer array following transmission of said third and fourth beams;

filtering said second beamsummed receive signal to form third and fourth signal components;

summing said first and third signal components to form a first decoded signal;

summing said second and fourth signal components to form a second decoded signal;

forming first and second image signals derived from said first and second decoded signals respectively; and displaying an image having a first image portion which is a function of said first image signal and a second image portion which is a function of said second image signal, wherein said first through fourth beams of encoded pulse sequences are derived from first through fourth code sequences respectively, said first and second code sequences being a first complementary pair of code sequences, said third and fourth code sequences being a second complementary pair of code sequences, said first and second complementary pairs of code sequences being orthogonal.

19. The method as defined in claim 18, wherein said first complementary pair of code sequences is a first Golay code pair and said second complementary pair of code sequences is a second Golay code pair.

20. A system for transmitting ultrasound beams comprising:

an ultrasound transducer array comprising a multiplicity of transducer elements;

a transmit sequence source for providing first through fourth encoded base sequences from convolution of a base sequence with first through fourth code sequences, said first and second code sequences being a first complementary pair, said third and fourth code sequences being a second complementary pair, and to said first and second complementary pairs being orthogonal; and means for driving selected transducer elements to transmit first through fourth beams of encoded pulse sequences derived from said first through fourth encoded base sequences respectively, said first and second beams having a first transmit focal zone, said third and fourth beams having a second transmit focal zone different than said first transmit focal zone, and said first and third beams being transmitted before said second and fourth beams.

21. The system as defined in claim 20 wherein said means for driving selected transducer elements comprises a multiplicity of pulsers coupled to said transmit sequence source, and a look-up table coupled to said pulsers.

22. The system as defined in claim 20, wherein said first complementary pair is a first Golay code pair and said second complementary pair is a second Golay code pair.

23. A system for imaging ultrasound scatterers, comprising:

an ultrasound transducer array comprising a multiplicity of transducer elements;

a transmit beamformer programmed to cause said transducer array to transmit first through fourth beams of encoded pulse sequences derived from first through fourth code sequences respectively, said first and second code sequences being a first complementary pair, said third and fourth code sequences being a to second complementary pair, said first and second complementary pairs being orthogonal, said first and second beams having a first transmit focal zone, and said third and fourth beams having a second transmit focal zone different than said first transmit focal zone;

a receive beamformer programmed to form a first beamsummed receive signal from a first set of signals received and transduced by said transducer array following transmission of said first and third beams and to form a second beamsummed receive signal from a second set of signals received and transduced by said transducer array following transmission of said second and fourth beams;

a demodulator for demodulating said first and second beamsummed receive signals to form first and second demodulated signals respectively;

a first filter for passing a first signal component from said first demodulated signal and a second signal component from said second demodulated signal;

a second filter for passing a third signal component from said first demodulated signal and a fourth signal component from said second demodulated signal;

a first vector summer for summing said first and second signal components to form a first decoded signal; a second vector summer for summing said third and fourth signal components to form a second decoded signal;

a processor programmed to form first and second image signals derived from said first and second decoded signals respectively; and a display monitor for displaying an image having a first image portion which is a function of said first image signal and a second image portion which is a function of said second image signal.

24. The system as defined in claim 23 wherein each of said first and second filter comprises a finite impulse response filter.

* * * * *